(12) United States Patent
Chen

(10) Patent No.: US 9,741,272 B1
(45) Date of Patent: Aug. 22, 2017

(54) METHODS, APPARATUSES, AND CONTROL SYSTEMS FOR ADAPTIVE WIND-DRIVEN OUTDOOR ALL-SURROUNDING INFORMATION DISPLAY

(71) Applicant: DONGGUAN UNIVERSITY OF TECHNOLOGY, Dongguan, Guangdong (CN)

(72) Inventor: Baiman Chen, Guangdong (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 0 days.

(21) Appl. No.: 15/459,015

(22) Filed: Mar. 15, 2017

(30) Foreign Application Priority Data

Jul. 6, 2016 (CN) .......................... 2016 1 0534260

(51) Int. Cl.
| | | |
|---|---|---|
| G09F 11/235 | (2006.01) | |
| G09F 11/04 | (2006.01) | |
| G09F 11/10 | (2006.01) | |
| G09F 7/22 | (2006.01) | |
| G09F 15/00 | (2006.01) | |
| F03D 3/00 | (2006.01) | |
| F03D 9/25 | (2016.01) | |
| F03D 7/06 | (2006.01) | |
| F03D 17/00 | (2016.01) | |

(52) U.S. Cl.
CPC ............ *G09F 11/235* (2013.01); *F03D 3/005* (2013.01); *F03D 7/06* (2013.01); *F03D 9/25* (2016.05); *F03D 17/00* (2016.05); *G09F 7/22* (2013.01); *G09F 11/04* (2013.01); *G09F 11/10* (2013.01); *G09F 15/0087* (2013.01); *F05B 2270/101* (2013.01); *F05B 2270/20* (2013.01); *F05B 2270/32* (2013.01); *F05B 2270/321* (2013.01); *F05B 2270/504* (2013.01)

(58) Field of Classification Search
CPC .. G09F 11/23; G09F 11/0235; G09F 15/0087; G09F 11/10; G09F 11/04; G09F 7/22; F03D 9/25; F03D 3/005; F03D 7/06
See application file for complete search history.

(56) References Cited

U.S. PATENT DOCUMENTS

| | | | | |
|---|---|---|---|---|
| 6,175,354 | B1 * | 1/2001 | Blissett | ............... F04D 29/38 345/110 |
| 6,193,384 | B1 * | 2/2001 | Stein | .................. F04D 25/088 362/812 |

(Continued)

*Primary Examiner* — Gary C Hoge

(57) ABSTRACT

A method for adaptive wind-driven outdoor all-surrounding information display is disclosed, the method including: 1) installing an outdoor information display apparatus, of which a support means cooperates with a wind rotating means to achieve wind power generation and rotational speed control of an information display means; 2) disposing a plurality of electronically controlled light-emitting display strips on the sails; 3) installing a plurality of working units of a motor/electric generation assembly; 4) installing a control system so that the dynamic trajectories of the rotating electronically controlled light-emitting display strips after they are lit are successively connected with each other thereby creating an all-surrounding and continuous visible graphic and textual image. Apparatuses and control systems implementing the above method are also provided.

18 Claims, 5 Drawing Sheets

(56) References Cited

U.S. PATENT DOCUMENTS

| | | | | |
|---|---|---|---|---|
| 6,492,963 B1* | 12/2002 | Hoch | ............ | B62J 6/20 |
| | | | | 340/432 |
| 7,161,256 B2* | 1/2007 | Fang | ............ | H02K 7/1807 |
| | | | | 290/1 R |
| 8,411,108 B2* | 4/2013 | Gilbert | ............ | B60K 35/00 |
| | | | | 345/619 |
| 8,851,838 B2* | 10/2014 | Kim | ............ | F03D 3/068 |
| | | | | 415/4.2 |
| 8,872,375 B2* | 10/2014 | Kamen | ............ | F03D 3/005 |
| | | | | 290/55 |
| 9,347,428 B2* | 5/2016 | Rhee | ............ | F03D 9/17 |
| 9,562,518 B2* | 2/2017 | Patel | ............ | F03D 7/06 |
| 2007/0247832 A1* | 10/2007 | Barker | ............ | G09F 23/02 |
| | | | | 362/96 |

* cited by examiner ly to the utilization of clean energy and outdoor dynamic information display technology, and more particularly to methods, apparatuses, and control systems for adaptive wind-driven outdoor all-surrounding information display.

METHODS, APPARATUSES, AND CONTROL SYSTEMS FOR ADAPTIVE WIND-DRIVEN OUTDOOR ALL-SURROUNDING INFORMATION DISPLAY

CROSS-REFERENCE TO RELATED APPLICATIONS

The present application claims foreign priority of Chinese Patent Application No. 201610534260.6, filed on Jul. 6, 2016 in the State Intellectual Property Office of China, the contents of all of which are hereby incorporated by reference.

FIELD OF THE PRESENT DISCLOSURE

Embodiments of the present disclosure relate generally to the utilization of clean energy and outdoor dynamic information display technology, and more particularly to methods, apparatuses, and control systems for adaptive wind-driven outdoor all-surrounding information display.

BACKGROUND OF THE PRESENT DISCLOSURE

With the rapid development of business information dissemination services, a variety of outdoor information display devices such as billboards have become a public infrastructure. The prior art outdoor information display devices are found in a variety of styles and have relatively wide applications. A common example of an outdoor information display device may be a single-sided or double-sided billboard resembling an anti-aircraft gun that is fixedly installed on the roadside, which however can provide relatively small effective advertising space and can be static and dull. Another example could be a trivision billboard rotated by motor-driven rollers. This type of billboards can increase the amount of information presented in the same advertising space and can cyclically switch between several advertisements. However, they can only be viewed from one direction, which means a very limited viewing angle. In addition, these rotary billboards rely on external power supplies, and in high winds they may experience extremely large impacts and so could be easily damaged.

Existing outdoor LED matrix display billboards employ a controller to control the ON/OFF or color of an LED at each position of the square fixedly set LED matrix panel to produce a variety of dynamic graphic and textual information. But a large number of LEDs would be required, resulting in high overall energy consumption and high operation and management costs. Moreover, they can only provide a fixed viewing angle of around 150°, so that a full 360° viewing angle is not allowed.

Wind is one of the most common clean energy sources in nature, and wind power is also a conventional technology. However, it is less common to combine wind power with equipment such as outdoor billboards to exploit the wind to directly drive the rotation of large outdoor billboards and also provide electric energy for the billboards. To generate power from the wind, the billboard needs to spin fast, but on a fast spinning billboard the advertising (graphic and textual) information would become blurred so that it would be awkward for an observer at a fixed position under the billboard to make out the contents displayed thereon.

Therefore, in the prior art where the wind is used to drive the billboard for power generation, the information would be unable to be clearly displayed on the billboard. In particular, the natural wind is often unsteady and noncontinuous, hence resulting in a changing rotational speed of the billboard and also an unstable information presentation on the billboard that is driven by the wind. On the other hand, if people wish to see clearly the contents on the billboards, then the information carrier presented on the billboard must be kept stable. These all are problems not yet overcome by the prior art.

SUMMARY OF THE PRESENT DISCLOSURE

In view of the above, it is the primary objective of the present disclosure to provide methods, apparatuses, and control systems for adaptive wind-driven outdoor all-surrounding information display, by which the wind energy can be exploited to drive the billboard for rotation and power generation while the information on the billboard can be clearly displayed, the image presented on the billboard can be kept stable even when changes in the magnitude of the natural wind cause the driving force of the billboard to vary, the outdoor billboard can be enabled to create and maintain a 360° all-surrounding and continuous visible image, and adaptation can be achieved through sensor sensing and control of relevant parameters.

There is also provided a multifunction wind-driven information display apparatus that implements the above method and is capable of starting in a breeze and controlling its rotational speed in a strong wind. The information display apparatus is capable of rotating by wind and generating electricity for use of the information display apparatus itself and the lighting in peripheral public spaces, hence enabling the apparatus with energy-saving and environmental protection features. In particular, the special airfoil-shaped sails employed by the disclosure enable the information display apparatus to rotate in a breeze. The larger sails used herein not only enhance the wind energy capturing effects but achieve a larger information display area. In addition, since the wind energy can be effectively converted to kinetic energy, the strength requirements for the main pillar and the main pillar base are reduced and their anatomy could be more scientific and stable.

A solution adopted by the present disclosure for solving the above-mentioned problems is as follows.

There is disclosed a method for adaptive wind-driven outdoor all-surrounding information display, the method comprising:

1) installing an outdoor information display apparatus driven by the natural outdoor wind, the apparatus being provided from bottom to top with a support means, a wind rotating means, and an information display means, the support means and the wind rotating means cooperating with each other to achieve wind power generation and rotational speed control of the information display means;

2) disposing an annular baseplate on the wind rotating means and a plurality of sails (usually of an odd number) on the annular baseplate for capturing wind energy and converting it to mechanical power; and installing an information display device on each sail, the information display device being comprised of at least one electronically controlled light-emitting display strip disposed on an outer elevation of the sail and used to distribute graphic and textual information;

3) installing on the support means and the wind rotating means a plurality of working units of a motor/generator assembly that cooperate with each other to drive the wind rotating means to generate power or keep spinning, the motor/generator assembly turning the mechanical power of the wind rotating means to electric power and storing the electric power or converting the stored electric power to mechanical energy to maintain the rotation of the wind rotating means, thereby enabling adaptive control and adjustment of the mutual conversion relation and ratio between the mechanical energy and the electric energy by switching between the electric-operating and electric-generating modes or by controlling the number of active working units on the support means and the wind rotating means;

4) installing a control system that is coupled to each of the working units of the motor/generator assembly and each of the electronically controlled light-emitting display strips. The control system may control the cooperation among the working units on the wind rotating means and the support means thus enabling the wind rotating means and the support means to make adaptive adjustments in different wind conditions, according to the natural wind condition detected by the control system. In particular, the control system may automatically control the mutual conversion ratio between the mechanical energy and the electric energy so as to control the sails to operate within a predetermined rotational speed range, or instantaneously control, according to the actual rotational speed or speed change under the drive of the natural wind, the lighting time, lighting duration, lighting interval, and displayed content of each electronically controlled light-emitting display strip or control part or all of the electronically controlled light-emitting display strips to be in operation, so that the dynamic trajectories of the contents displayed by all electronically controlled light-emitting display strips after they are lit and rotate are successively connected with each other thus creating an all-surrounding and continuous visible graphic and textual image.

There is also disclosed an apparatus for adaptive wind-driven outdoor all-surrounding information display that implements the above method, the apparatus being installed outdoors and driven by wind, the apparatus comprising, from bottom to top:

a support means, a wind rotating means, and an information display means, the support means and the wind rotating means cooperating with each other to achieve wind power generation and rotational speed control of the information display means;

an annular baseplate disposed on the wind rotating means and a plurality of sails on the annular baseplate for capturing wind energy and converting it to mechanical power; and an information display device installed on each sail, the information display device comprising at least one electronically controlled light-emitting display strip disposed on an outer elevation of the sail and used to distribute graphic and textual information;

a plurality of working units of a motor/generator assembly that are installed on the support means and the wind rotating means and that cooperate with each other to drive the wind rotating means to generate power or keep spinning, the motor/generator assembly turning the mechanical power of the wind rotating means to electric power and storing the electric power or converting the stored electric power to mechanical energy to maintain the rotation of the wind rotating means, thereby enabling adaptive control and adjustment of the mutual conversion relation and ratio between the mechanical energy and the electric energy by switching between the electric-operating and electric-generating modes or by controlling the number of active working units on the support means and the wind rotating means;

a control system coupled to each of the working units of the motor/generator assembly and to each of the electronically controlled light-emitting display strips. The control system may control the cooperation among the working units on the wind rotating means and the support means thus enabling the wind rotating means and the support means to make adaptive adjustments under different wind conditions, according to the natural wind condition detected by the control system. In particular, the control system may automatically control the mutual conversion ratio between the mechanical energy and the electric energy so as to control the sails to operate within a predetermined rotational speed range, or instantaneously control, according to the actual rotational speed or speed change under the drive of the natural wind, the lighting time, lighting duration, lighting interval, and displayed content of each electronically controlled light-emitting display strip, so that the dynamic trajectories of the displayed contents of all electronically controlled light-emitting display strips after they are lit and rotate are successively connected with each other thus creating an all-surrounding and continuous visible graphic and textual image.

A rotational speed sensor and a controller may further be provided on top of the support frame. The power output terminal of each power generating coil may be coupled to the power input terminal of a storage battery. The controller may control the number of power generating coils coupled to the battery by detecting the rotational speed information sent from the rotational speed sensor.

There is further disclosed a control system for adaptive wind-driven outdoor all-surrounding information display that implements the above method, the control system comprising:

a PLC (Programmable Logic Controller) controller, a computation module, a storage module, a sensor module, and an input and output module. The PLC controller may be embedded with control software that is included with conditional functions used to control the rotational speed of the wind rotating means and the number of active electronically controlled light-emitting display strips and relevant operating parameters. In particular, the PLC controller may control simultaneously the rotational speed of the wind rotating means and the initial lighting time, lighting duration, lighting interval, and displayed content of each electronically controlled light-emitting display strip of the information display devices, or control part or all of the electronically controlled light-emitting display strips to be in operation, so that the trajectories trailed by each of the electronically controlled light-emitting display strips after they are lit and rotate form a continuous and complete image on the entire cylindrical surface. If the visual retention time coefficient is taken as p seconds, then to control the rotational speed of the wind rotating means within the predetermined range the control function can be as follow:

$$2\pi = pn\omega \tag{3}$$

or $$2\pi R = pnv \tag{4}$$

where:
p is the visual retention time coefficient, and $0.1s \leq p \leq 0.4s$;
n is the total number of active electronically controlled light-emitting display strips on the sails, and $1 \leq n \leq 2m$, where m is the number of sails;
$\omega$ is the angular velocity of the annular baseplate of the wind rotating means, and $\pi/pm \leq \omega \leq 2\pi$ rad/s;
R is the radius of the annular baseplate, and $1m \leq R \leq 50m$; and v is the tangential velocity of the sails on the annular baseplate of the wind rotating means, with a unit of m/s;

Assuming an image is continued a period of $t_1$ after an electronically controlled light-emitting display strip is lit, and the display strip rotates an angle of θ during the period of $t_1$, then $t_1$ can be related with the angular velocity by:

$$t_1 = \theta/\omega \text{ or } \theta = t_1 * \omega \quad (5)$$

The information display apparatus needs to meet the following condition so that the trajectories trailed by the active display strips can form a continuous and complete image on the entire cylindrical surface:

$$2\pi = \theta * n \text{ or } n = 2\pi/\theta \quad (6)$$

where: n is the total number of active electronically controlled light-emitting display strips on the sails, and 1≤n≤2m, where m is the number of sails; and ω is the angular velocity of the annular baseplate of the wind rotating means, and π/pm≤ω≤2π rad/s.

Assuming, during the continuous rotation process of the same electronically controlled light-emitting display strip, a first image after the electronically controlled light-emitting display strip is lit is sustained a period of $t_1$ before it is turned off, and after a time interval of $t_2$ a consecutive second image is re-lit, then the following condition has to be satisfied so that the trajectories produced by the display strips after they are successively lit can form a continuous and complete image on the entire cylindrical surface:

$$t_2 = n_1(t_1 + p) \quad (7)$$

where: $n_1$ is the total number of active electronically controlled light-emitting display strips on each sail, and 1≤n≤2m, m being the number of sails;

p is the visual retention time coefficient, and 0.1s≤p≤0.4s;

$t_1$ is the duration when the first image created by the electronically controlled light-emitting display strip is kept lit, with a unit of s; and $t_2$ represents the time interval between the time when the first image is turned off after it has been lit for the continuous period of $t_1$ and the time when the consecutive second image is re-lit, during the continuous rotation process of the same electronically controlled light-emitting display strip, with a unit of s.

The sensor module may comprise at least one rotational speed sensor used to sense the rotational speed of the wind rotating means. The PLC controller may control the number of power generating coils set into the power generation mode according to the rotational speed information sent from the rotational speed sensor, the rotational speed of the wind rotating means being related to the number of power generating coils set into the power generation mode by a normal distribution function.

The method of the present disclosure can offer two adaptive operation control modes:

(1) Constant-speed adaptive operation mode, in which the control system may keep the rotational speed of the wind rotating means within a constant value range (e.g., within a tolerance of ±10% of the reference rotational speed) regardless of the change of the external natural wind condition. The control system may base on a preset program while factoring the realtime rotational speed as a constant to control the initial lighting time, lighting duration, lighting interval, and displayed content of each electronically controlled light-emitting display strip, or control part or all of the electronically controlled light-emitting display strips to be in operation, so that the trajectories swept by the rotating electronically controlled light-emitting display strips after they are lit create a continuous and complete image on the entire cylindrical surface;

(2) Variable-speed adaptive operation mode, in which the control system may keep the rotational speed of the wind rotating means within the predetermined rotational speed range which is bound by a maximum rotational speed and a minimum rotational speed, according to the actual change of the external natural wind condition, rather than applying control over the realtime rotational speed that falls within the range, (e.g., a tolerance of ±10 times the reference rotational speed is offered, but the wind rotating means needs to be controlled to operate within the safe operation speed range). The control system may base on the predetermined program while factoring the realtime rotational speed as the reference variable to control the initial lighting time, lighting duration, lighting interval, and displayed content of each electronically controlled light-emitting display strip, or control part or all of the electronically controlled light-emitting display strips to be in operation, so that the trajectories swept by the rotating electronically controlled light-emitting display strips after they are lit create a continuous and complete image on the entire cylindrical surface.

Both of the above two adaptive operation control modes can match up the realtime rotational speed (used to ensure the power generation efficiency) with the initial lighting time, lighting duration, lighting interval, and displayed content of each electronically controlled light-emitting display strip (used to ensure the advertising information display effects), thereby balancing the power generation efficiency and the advertising information display effects and so solving the problems that are not yet solved by the conventional technology.

The core concept of the disclosure lies in that on the basis of keeping the equipment rotating at a relatively high speed and residing in the power generation state, a visible image is produced by the trajectories of the plurality of simultaneously rotating electronically controlled light-emitting display strips after they are lit using the persistence of vision principle to display information, rather than using the visible image created by the light emitted or reflected from a stationary (fixed) member to distribute information. Compared with the traditional billboards, the information display apparatus of the present disclosure is energy-saving and has a large information display area and can provide better display effects.

The methods, apparatuses, and control systems for wind-driven information display disclosed by the present disclosure can provide multiple functions and operation modes. The information display apparatus can be driven to rotate in a breeze so that the wind energy can be converted to electric power for use or storage, which can reduce the impact of the wind to the information display apparatus and so reduce the strength requirements for the main pillar and the main pillar base. The stored power can be used for rotation and advertising when there is no wind or when there is only a slight wind. In addition, the present disclosure can also automatically adjust the number of coils coupled to the loop that cuts the magnetic field lines by sensing the rotational speed of the sail system, and in turn the rotational speed of the sail system can be controlled by the resistance produced when the coils cut the magnetic field lines. The present disclosure may have the following advantages:

1: The unique airfoil-shaped sails and the relatively large wind capturing area of the airfoil-shaped sails enable the sail system to start under a breeze, so that the information display apparatus can still rotate even in a slight wind. Consequently, the information display apparatus would be able to rotate in most of the time to maintain their dynamic effects, making it more likely to attract people's attention.

2: The rotational speed sensor can automatically adjust the number of coils coupled to the loop that participate in cutting the magnetic field lines, and the rotational speed of the sail system can be controlled by the resistance produced by the coils cutting the magnetic field lines. The greater the rotational speed of the sail system, the larger the number of coils coupled to the loop that participate in cutting the magnetic field lines, whereby the rotational speed of the sail system can be constricted within a certain range, which can not only ensure the safety of the rotation and power generation system, but prevent the speed changes of the advertising surface from affecting the advertising effects of the information display means.

3: The present disclosure can convert part or all of the captured natural wind energy to kinetic energy by rotation, which, on one hand, reduces the impact of the wind to the information display apparatus, and so reduces the strength requirements for the main pillar and the main pillar base, thus optimizing the structure of the information display apparatus, reducing its failure rate, and extending its service life; on the other hand, reduces or eliminates the need to supply power to maintain its rotation.

4: The rotation of the sail system enables the advertisement created by the trajectories of the light-emitting strips on the airfoil-shaped sails to be displayed in 360 degrees with a wide viewing angle, thus greatly improving the space utilization.

5: The trajectories of the light-emitting strips on the airfoil-shaped sails after they are lit and rotate can create an image on the entire cylindrical surface to distribute advertising information, thus greatly increasing the effective information utilization area. The information display apparatus according to the present disclosure has an aesthetic appearance and is also harmonious with the style of the contemporary cities and advantageous in energy-saving, information distribution, and city embellishment.

Figure 1:
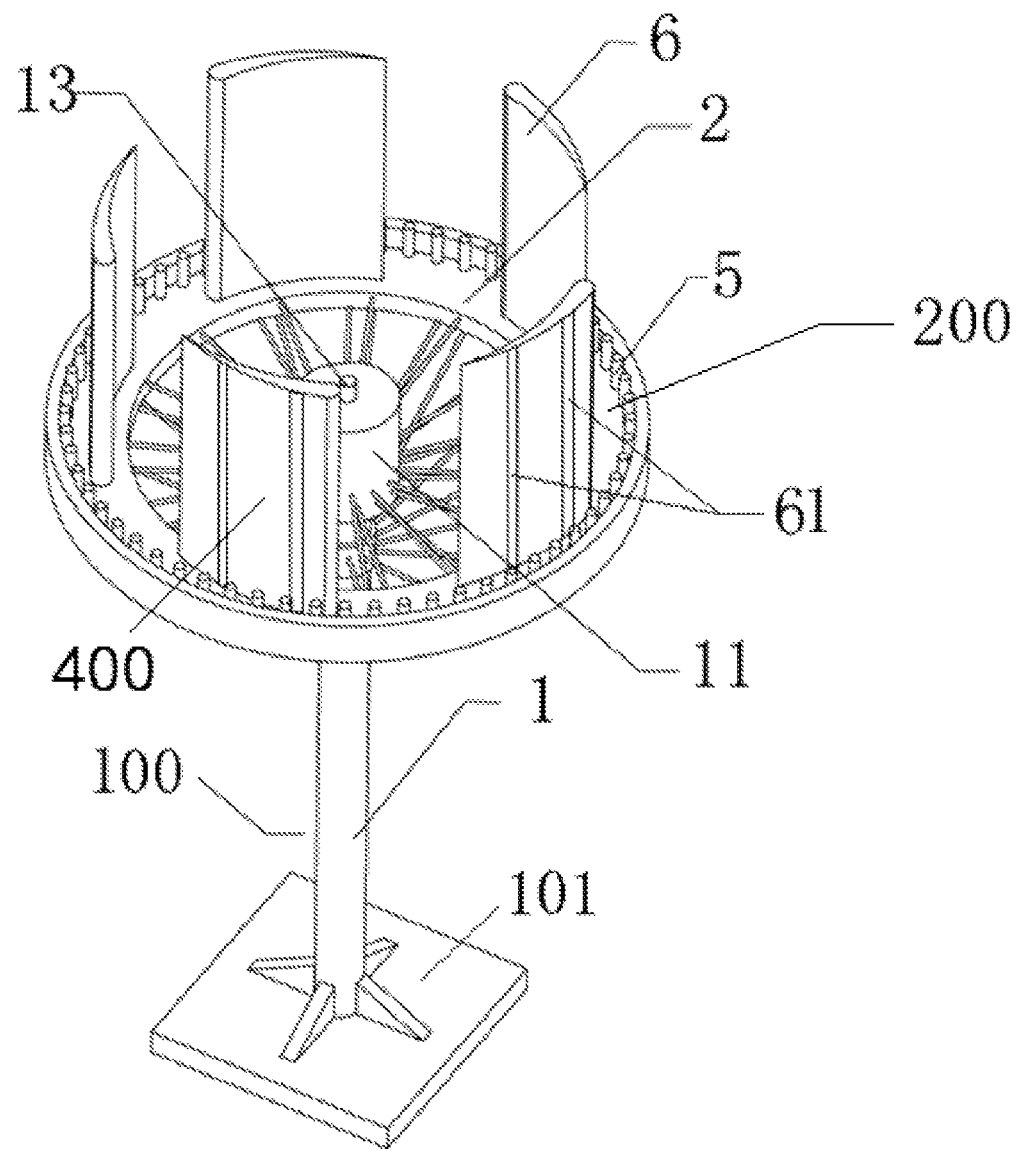
FIG. 1 shows a perspective view of a multifunction wind-driven apparatus for outdoor all-surrounding information display according to an exemplary embodiment of the present disclosure.

In the drawings:
1—Main pillar; 11—First shaft shoulder; 12—Second shaft shoulder; 13—Rotational speed sensor; 2—Annular baseplate; 3—Annular fixing frame; 4—Permanent magnet; 5—Coil; 6—Sail; 61—Electronically controlled light-emitting display strip; 62—Block; 7—First spoke set; 8—Storage battery; 9—Timer; 14—Second spoke set; 100—Support means; 200—Wind rotating means; 300—Power generation and storage assembly; 400—Information display means.

DETAILED DESCRIPTION OF THE EMBODIMENTS

In order to render the objectives, solutions, and advantages of the present disclosure more definite and unambiguous, the present disclosure will now be described in greater detail with reference to the accompanying drawings and embodiments. It is to be appreciated that the specific embodiments described herein are for illustration purposes only and are not intended to be limiting the scope of the present disclosure.

Embodiment 1

Referring to FIGS. 1-6, the method for adaptive wind-driven outdoor all-surrounding information display disclosed by the present disclosure may comprise the following blocks.

1) installing an outdoor information display apparatus driven by the natural outdoor wind, the apparatus being provided, from bottom to top, with a support means 100, a wind rotating means 200, and an information display means 400, the support means 100 and the wind rotating means 200 cooperating with each other to achieve wind power generation and rotational speed control of the information display means 400;

2) disposing an annular baseplate 2 on the wind rotating means 200 and a plurality of sails 6 (sails 6 are usually of an odd number, which is 5 in the present embodiment; in other embodiments it can be 3, 7, 9, etc. so as to produce a steady drive force by the motion of the wind) on the annular baseplate 2 for capturing wind energy and converting it to mechanical power; and installing an information display device 400 on each sail 6, the information display device 400 comprising at least one electronically controlled light-emitting display strip 61 disposed on an outer elevation of the sail 6 and used to distribute graphic and textual information. The electronically controlled light-emitting display strip 61 can be a high-power LED light strip or ribbon;

3) installing on the support means 100 and the wind rotating means 200 a plurality of working units of a motor/generator assembly that cooperate with each other to drive the wind rotating means 200 to generate power or keep spinning, the motor/generator assembly turning the mechanical power of the wind rotating means 200 to electric power and storing the electric power or converting the stored electric power to mechanical energy to maintain the rotation of the wind rotating means 200, thereby enabling adaptive control and adjustment of the mutual conversion relation and ratio between the mechanical energy and the electric energy by switching between the electric-operating and electric-generating modes or by controlling the number of active working units on the wind rotating means 200 and the support means 100;

4) installing a control system that is coupled to each of the working units of the motor/generator assembly and to each of the electronically controlled light-emitting display strips 61. The control system may control the cooperation among the working units on the wind rotating means 200 and the support means 100 thus enabling the wind rotating means and the support means to make adaptive adjustments under different wind conditions, according to the natural wind condition detected by the control system. In particular, the control system may automatically control the mutual conversion ratio between the mechanical energy and the electric energy, so as to control the sails 6 to operate within a predetermined speed range (below the maximum rated rotational speed), or instantaneously control, according to the actual rotational speed or speed change of the sails 6 under the drive of the natural wind, the lighting time, lighting duration, lighting interval, and displayed content of each electronically controlled light-emitting display strip 61, so that the dynamic trajectories of the displayed contents of all electronically controlled light-emitting display strips 61 after they are lit and rotate are successively connected with each other thus creating an all-surrounding and continuous visible graphic and textual image.

The plurality of electronically controlled light-emitting display strips 61 can be arranged at fixed positions on the sails 6 in an axisymmetric, centrosymmetric, or asymmetrical manner and so cooperatively operate with the control system, and in each electronically controlled light-emitting display strip 61 can be provided a single-row or multiple parallel rows of LED light beads.

The working units discussed in the blocks 3) and 4) may comprise power generation units and motor units. The power generation units may be composed of power generating windings 5 or magnets 4 of a plurality of stators and rotors which are disposed oppositely on the support means 100 and the wind rotating means 200. The motor units may be composed of a plurality of electric motors and transmission gear sets provided on the support means 100 or the wind rotating means 200.

While in the present embodiment the specific position of the motor generator is not shown, two or three or a plurality of motor generators or transmission gear sets may be provided on the support means 100 or the wind rotating means 200 in an axisymmetric or centrosymmetric manner according to actual needs in order to generate power or drive the wind rotating means 200 to rotate at a predetermined rotational speed, thereby ensuring the information distribution effects.

The control system mentioned in block 4) can switch between different operating modes according to the sensed wind condition:

41) In a moderate wind when the wind rotating means 200 does not exceed the set maximum or minimum speed, the system may switch the operating mode of the equipment to power-generation/forward mode, cut off the motor units, turn on part of the working units of the motor/generator assembly to generate power and store the electric power and supply power to the information display means 400. In accordance with the normal function control conditions, the stronger the wind, the larger the number of power generation units that are turned active, while the gentler the wind, the smaller the number of active power generation units. The resistance produced when the connected power generation units are operating can be used to control the rotational speed to maintain the display apparatus at the normal rotational speed and so enable the dynamic trajectories of the contents displayed by the plurality of rotating electronically controlled light-emitting display strips after they are lit to be successively connected, thus creating an all-surrounding and continuous visible graphic and textual image;

42) When the wind is exceedingly strong and the wind rotating means 200 does not surpass the predetermined maximum rotational speed, the system may switch the operating mode of the equipment to power generation/protection mode, cut off the motor units, turn on all power generation units of the motor/generator assembly to fully generate power, store the electric power, and turn off the information display means, so as to constrict the rotational speed and maintain the safety of the display apparatus;

43) When the wind is too small and the speed of the wind rotating means 200 is lower than the set minimum speed, the system may switch the operating mode of the equipment to the electric-operating/reverse mode, cut off the power generation units to stop generating power, turn on the motor units to convert the stored electric power to mechanical energy so as to maintain the display apparatus at the set minimum rotational speed, so that the dynamic trajectories of the contents displayed by the plurality of rotating electronically controlled light-emitting display strips after they are lit are successively connected with each other to form an all-surrounding and continuous display of visible graphic and textual image.

The control system may simultaneously control the rotational speed of the wind rotating means and the initial lighting time, lighting duration, lighting interval, and displayed content of each electronically controlled light-emitting display strip of the information display means 400, so as to enable the trajectories swept by the plurality of electronically controlled light-emitting display strips 61 after they are lit to form a continuous and complete image on the entire cylindrical surface. If the visual retention time coefficient is taken as p seconds, then to control the rotational speed of the wind rotating means 200 within the predetermined range the various parameters may need to satisfy the following relation:

$$2\pi = pn\omega \quad (1)$$

or $$2\pi R = pnv \quad (2)$$

where:
p is the visual retention time coefficient, and $0.1 \leq p \leq 0.4s$;
n is the total number of active electronically controlled light-emitting display strips on the sails, and $1 \leq n \leq 2m$, where m is the number of sails;
$\omega$ is the angular velocity of the annular baseplate of the wind rotating means, and $\pi/pm \leq \omega \leq 2\pi$ rad/s;
R is the radius of the annular baseplate, and $1m \leq R \leq 50m$ rad/s; and
v is the tangential velocity of the sails on the annular baseplate of the wind rotating means, with a unit of m/s;

For example, the radius R of the annular baseplate of the wind rotating means 200 can be 10 meters. Assuming there now are provided 9 sails, the total number of active electronically controlled light-emitting display strips is n and the visual retention time coefficient p is 0.1 second, then the various parameters need to satisfy the following relation:

$$2\pi = 0.1 \times n \times \omega$$

or $$\omega = 2\pi/(0.1 \times n) = 20\pi/n$$

In particular, if in the constant-speed control mode the maximum rotational speed ω=2π rad/s is applied, then n=10; if ω=5π/3 rad/s is applied, then n=12; if ω=4π/3 rad/s is applied, then n=15; and if the minimum rotational speed ω=π/(0.1×9)=10π/9 rad/s is applied, then n=18.

If the maximum rotational speed is applied and n=10, then the tangential speed would be:

$$2\pi R = pnv, v = 2\pi R/pn = 2\pi*10/(0.1*10) = 20\pi/s$$

If the minimum rotational speed is applied and n=18, then the tangential speed would be:

$$v = 2\pi R/pn = 2\pi*10/(0.1*18) = 100\pi/9/s$$

Actually, ω=0.5π~2π rad/s is the rotational speed range in which the equipment has comparatively high power generation efficiency, and also the one in which the equipment runs the best.

If there are provided 5 sails, the total number of active electronically controlled light-emitting display strips is n and the visual retention time coefficient p is 0.2 second, then the various parameters need to satisfy the following relation:

$$2\pi = 0.2 \times n \times \omega$$

or $$\omega = 2\pi/(0.2 \times n) = 10\pi/n$$

In particular, if in the constant-speed control mode the maximum rotational speed ω=2π rad/s is applied, then n=5; if ω=5π/3 rad/s is applied, then n=16; if ω=4π/3 rad/s is applied, then n=8; and if the minimum rotational speed ω=π/(0.2×5)=π/1 rad/s is applied, then n=10.

The maximum rotational speed of the wind rotating means 200 would also be selected in consideration of the structure and material strength of the sails, the maximum centrifugal force that can be sustained, and so on.

If the maximum rotational speed is taken as ω=2π(rad/s), then the centrifugal force would be $F=\omega_{max2}^2 RM=395M(N)$, so that when the speed is greater than the maximum speed, there would be need for structural strengthening design or material strengthening, otherwise the equipment operation may be unstable, which may affect the overall equipment safety and longevity.

Each electronically controlled light-emitting display strip 61 may comprise a backlight plate disposed oriented outwards inside an outer elevation of the corresponding sail 6, a plurality of LED light-emitting strips, and a light guide column arranged on the outer elevation. The LED light-emitting strip may comprise a single-row or multiple parallel rows of high power LED light beads, the LED light beads being controlled to emit light to create all kinds of graphic and textual information. The light guide column may be a cylinder or cone with a geometric centerline of a downward inclination angle of 5~45°, so as to enhance the image display effects after light-guiding, which, in particular, is advantageous for the observer under the equipment to better observer a clear and continuous graphic and textual image.

An adaptive wind-driven apparatus for outdoor all-surrounding information display that implements the above method is also provided, the apparatus being installed outdoors and driven by wind, the apparatus comprising, from bottom to top:

a support means 100, a wind rotating means 200, and an information display means 400, the support means 100 and the wind rotating means 200 cooperating with each other to achieve wind power generation and rotational speed control of the information display means 400;

an annular baseplate 2 disposed on the wind rotating means 200 and a plurality of sails 6 on the annular baseplate 2 for capturing wind energy and converting it to mechanical power; and an information display device 400 installed on each sail 6, the information display device 400 comprising at least one electronically controlled light-emitting display strip 61 disposed on an outer elevation of the sail 6 and used to distribute graphic and textual information;

a plurality of working units of a motor/generator assembly installed on the support means 100 and the wind rotating means 200 that cooperate with each other to drive the wind rotating means 200 to generate power or keep spinning, the motor/generator assembly turning the mechanical power of the wind rotating means 200 to electric power and storing the electric power or converting the stored electric power to mechanical energy to maintain the rotation of the wind rotating means 200, thus enabling adaptive control and adjustment of the mutual conversion relation and ratio between the mechanical power and the electric energy by switching between the electric-operating and electric-generating modes or by controlling the number of active working units on the wind rotating means 200 and the support means 100; and a control system coupled it to each of the working units of the motor/generator assembly and to each of the electronically controlled light-emitting display strips. The control system may control the cooperation among the working units of the wind rotating means 200 and the support means 100 thus enabling the wind rotating means 200 and the support means 100 to make adaptive adjustments under different wind conditions, according the natural wind condition detected by the control system. In particular, the control system may automatically control the mutual conversion ratio between the mechanical power and the electric energy so as to control the sails 6 to operate within a predetermined rotational speed range, or instantaneously control, according to the actual rotational speed or speed change under the drive of the natural wind, the lighting time, lighting duration, lighting interval, and displayed content of each electronically controlled light-emitting display strip 61, so that the dynamic trajectories of the displayed contents of all electronically controlled light-emitting display strips 61 after they are lit and rotate are successively connected with each other thus creating an all-surrounding and continuous visible graphic and textual image.

The working units may comprise power generation units and motor units. The power generation units may be composed of power generating windings of a plurality of stators and rotors which are disposed oppositely on the support means and the wind rotating means. The motor units may be composed of a plurality of electric motors and transmission gear sets provided on the support means or the wind rotating means.

This embodiment is specifically directed to a 20m-diameter outdoor sail billboard, the rotational speed of which is maintained at 15 to 20 r/min with a designed power generation capability of 500 kW/h, which can effectuate the advertising information distribution and the operation and lighting of the billboard itself, as well as the lighting of the peripheral public spaces within a radius of 5 kilometers, thus constituting a distributed energy supply point.

In the present embodiment, 400 sets of power generation units may be used, where the angular velocity is kept at ω=0.5~2/3π rad/s, so that an AC voltage of about 220V can be directly obtained. After the voltage regulation and rectification, the rated voltage that is suitable for power output standards of, e.g., China, can be outputted. The output voltage can serve as the driving power of the billboards and can also supply power to the peripheral electrical equipment; otherwise the electric power can be stored into the battery pack.

Or 400 sets of power generation units can be used, where the angular speed is maintained at ω=1/6~2/6π rad/s, so that an rated AC voltage of about 110V can be outputted after voltage regulation and rectification, which is suitable for the international power output standards of, e.g., the United States.

Of course, the number of connected electrodes of the power generation units, or the rotational speed can be adjusted to obtain different output voltages or currents to meet the specific power requirements of different locations.

Figure 2:
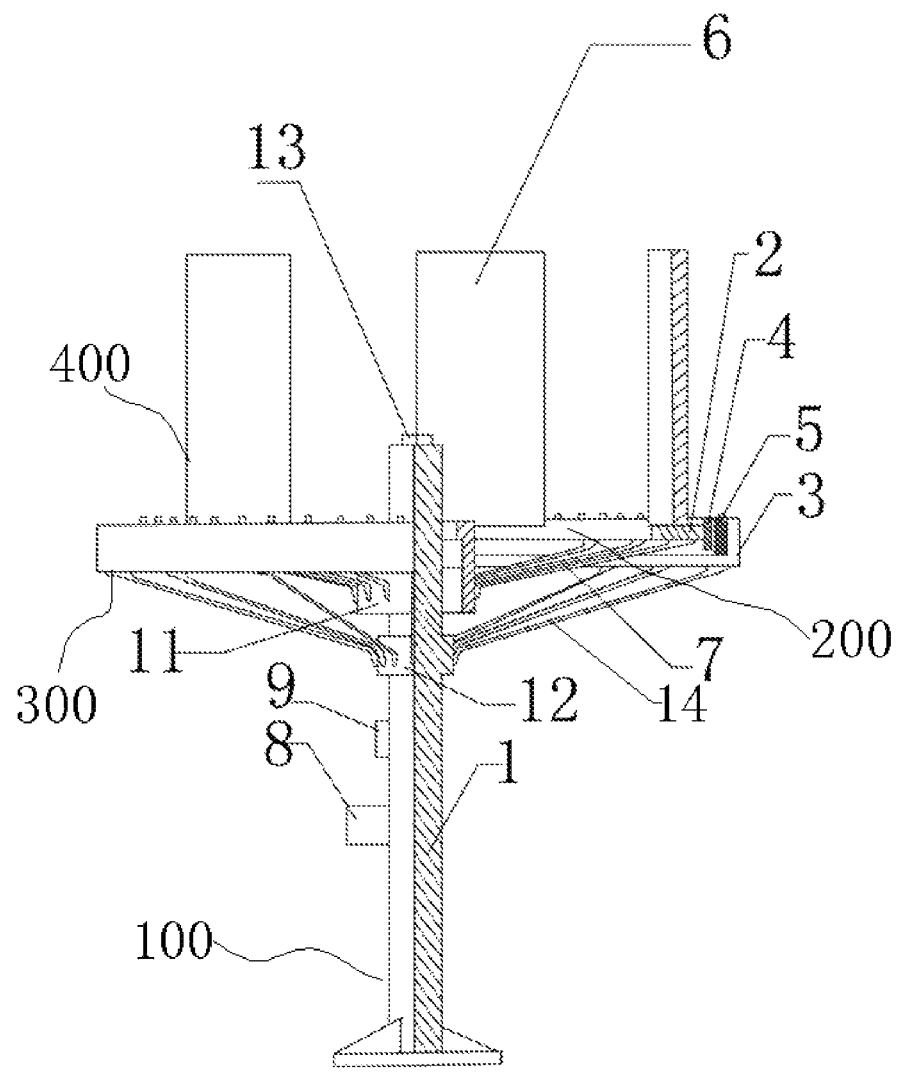
FIG. 2 shows a schematic partial cross-sectional view of a multifunction wind-driven apparatus for outdoor all-surrounding information display according to an exemplary embodiment of the present disclosure.

Referring now to FIGS. 1 and 2, the multifunction wind-driven information display apparatus according to the present embodiment may comprise:

a support means 100 used to fixedly hang or support the main body portion of the wind-driven information display apparatus;

a wind rotating means 200 disposed above the support means 100 and driven by wind for power generation and storage;

a power generation and storage assembly 300 disposed below the wind rotating means 200 and fixed to the support means 100 for power generation and storage in cooperation with the wind rotating means 200; and an information display means 400 disposed on the wind rotating means 200 and rotated by the rotation of the wind rotating means 200 and used to set the information display contents.

In a specific implementation, the support means 100 may be a support type frame or a hanging frame, etc. The present disclosure will now be described in further detail by taking the support frame for example.

The support frame 100 is used for supporting and fixing, and, as shown in FIG. 1, may include a base 101, and a main pillar 1 disposed on the base 101 and used to support the wind rotating means. The support frame can be installed on the ground, and the size of the base can be arranged according to the size and weight of the multifunction wind-driven information display apparatus so as to ensure that the main body portion of the wind-driven information display apparatus 400 can be firmly supported.

Further, as shown in FIG. 2, the wind rotating means 200 may include:

a first shaft shoulder 11 rotatably sheathed on the main pillar 1 of the support frame;

an annular baseplate 2 which is connected to the first shaft shoulder 11 through a first spoke set 7 and is used to install the sails 6;

a plurality of sails 6 provided along the top surface of the annular baseplate 2 for rotating the annular baseplate 2. The sails 6 can rotate the annular baseplate 2 by wind.

The first shaft shoulder 11 may be rotatably sheathed on the main pillar 1 of the support frame through a bearing. Further, in order to allow the first shaft shoulder to be rotatable and more reliably mounted on the main pillar 1, the first shaft shoulder 11 can be a cylindrical sleeve and so rotatably mounted onto the main pillar through a conical rolling bearing. A shoulder at a lower end of the conical rolling bearing can serve to axially position the conical rolling bearing, thereby the first shaft shoulder 11 can be more reliable in connection and the potential resistance can be reduced.

In addition, as shown in FIG. 1, the annular baseplate 2 can be connected to the first shaft shoulder 1 through a set of spokes which start from the inner cylindrical surface of the annular baseplate 2 and which are parallel to the plane of the annular baseplate 2 in combination with another set of spokes which start from the bottom surface of the annular baseplate 2 and which form an appropriate angle to the plane of the annular baseplate 2. Further, by connecting the annular baseplate 2 and the first shaft shoulder 11 through the plurality of spokes 7, the connection between the annular baseplate 2 and the first shaft shoulder 11 can be made more elastic and stable.

The information display device 400 may be an LED light-emitting strip or ribbon provided on an outer side of the sail. Alternatively, the information display device 400 can be a piece of information print paper or a liquid crystal display panel used for displaying contents. For example, the information display contents such as advertisements can be mounted onto the surface of the sails 6, and the annular baseplate 2 can then rotate to drive the billboard to rotate, thereby utilizing wind energy to rotate the billboard so as to enlarge the viewing angle. Of course, the distributed information, the display carrier or contents may be installed at any other convenient places on the wind rotating means 200 where they can be easily viewed, for example, at the interval between the two sails, or on an LED light-emitting column, etc.

A control system for implementing the method for adaptive wind-driven outdoor all-surrounding information display may comprise a PLC controller, a sensor module, and an input and output module. The PLC controller may be embedded with control software that includes conditional functions used to control the rotational speed of the wind rotating means and the number of active electronically controlled light-emitting display strips and relevant operating parameters. In particular, the PLC controller may simultaneously control the rotational speed of the wind rotating means and the initial lighting time, lighting duration, lighting interval, and displayed content of each electronically controlled light-emitting display strip 61 of the information display means, or control part or all of the electronically controlled light-emitting display strips 61 to operate, so that the trajectories trailed by each of the electronically controlled light-emitting display strips after they are lit and rotate create a continuous and complete image on the entire cylindrical surface. If the visual retention time coefficient is taken as p seconds, then to control the rotational speed of the wind rotating means within the predetermined range the control function can be as follows:

$$2\pi = pn\omega \tag{31}$$

or $$2\pi R = pnv \tag{32}$$

where:

p is the visual retention time coefficient, and $0.1s \leq p \leq 0.4s$;

n is the total number of active electronically controlled light-emitting display strips on the sails, and $1 \leq n \leq 2m$, where m is the number of sails;

ω is the angular velocity of the annular baseplate of the wind rotating means, and $\pi/pm \leq \omega \leq 2\pi$ rad/s;

R is the radius of the annular baseplate, and $1m \leq R \leq 50m$ rad/s; and v is the tangential velocity of the sails on the annular baseplate of the wind rotating means, with a unit of m/s;

Assuming an image is continued a period of $t_1$ after an electronically controlled light-emitting display strip is lit, and the display strip rotates an angle of θ during the period of $t_1$, then $t_1$ can be related with the angular velocity:

$$t_1 = \theta/\omega \text{ or } \theta = t_1 * \omega \tag{5}$$

The information display apparatus needs to meet the following condition so that the trajectories trailed by the active display strips can form a continuous and complete image on the entire cylindrical surface:

$$2\pi = \theta * n \text{ or } n = 2\pi/\theta \tag{6}$$

where: n is the total number of active electronically controlled light-emitting display strips on the sails, and 1≤n≤2m, where m is the number of sails; and ω is the angular velocity of the annular baseplate of the wind rotating means, and $\pi/pm \leq \omega \leq 2\pi$ rad/s.

Assuming, during the continuous rotation process of the same electronically controlled light-emitting display strip, a first image after the electronically controlled light-emitting display strip is lit is sustained a period of $t_1$ before it is turned off, and after a time interval of $t_2$ a consecutive second image is re-lit, then the following condition has to be satisfied so that the trajectories produced by the display strips after they are successively lit and rotate can form a continuous and complete image on the entire cylindrical surface:

$$t_2 = n_1(t_1 + p) \tag{7}$$

where: $n_1$ is the total number of active electronically controlled light-emitting display strips on each sail, and 1≤n1≤2m;

p is the visual retention time coefficient, and 0.1s≤p≤0.4s;

$t_1$ is the duration when the first image created by the electronically controlled light-emitting display strip is lit, with a unit of s; and $t_2$ represents the time interval between the time when the first image is turned off after it has been lit for the continuous period of $t_1$ and the time when the consecutive second image is re-lit, during the continuous rotation process of the same electronically controlled light-emitting display strip, with a unit of s.

In a specific embodiment, if the interval between two consecutive sessions during which the LED light strip of the electronically controlled light-emitting display strip 61 is kept illuminated is t, and the duration of time when the light strip is kept lit is also t, and during the duration of t the light strip rotates an angle of θ, then in order to create a superior image, θ may assume a value in the range of 0.02~0.20°, and t may be related to the angular velocity by:

$$t = \theta/\omega \tag{8}$$

The number of sails on the information display apparatus is m, and on each information display device the maximum number of active strips would be 2 so that a complete image can be created. In this case, the angular velocity of the annular baseplate of the wind rotating means assumes its minimum, $$\omega_{min} = 2\pi/2pm = \pi/pm \tag{9}$$

When the number of active strips is 1, the annular baseplate of the wind rotating means may have the maximum angular velocity. In this case, the total number of active strips is 1 and the angular speed $$\omega_{max1} = 2\pi/p = 20\pi \text{ rad/s} \tag{10}$$

Therefore, to form a complete image the angular velocity of the annular baseplate of the wind rotating means can determined as in the range of $\pi/pm \leq \omega_1 \leq 20\pi$ rad/s, according to the imaging laws.

The maximum rotational speed of the sails is determined by the structure and material of the equipment, taking into account the operation stability, safety, and power generation efficiency of the equipment:

Assuming the maximum rotational speed is $\omega_{max2}$, then one of the conditions that should be satisfied by the structure design and material of a single sail should be that the minimum centrifugal force designed to be sustained should be greater than the centrifugal force given by the following equation:

$$F \geq \omega_{max2}^2 RM(N) \tag{11}$$

where M is the mass of a single sail.

If the angular velocity of the annular baseplate of the wind rotating means $\omega > \omega_{max2}$, then the operating state of the equipment would be unstable, thereby affecting its safety and life.

The maximum value of the angular velocity of the annular baseplate 2 of the wind rotating means should be selected by taking into account three factors, namely, a complete image, the equipment safety, and the power generation efficiency. A smaller value of $\omega_{max1}$ and $\omega_{max2}$ can be taken as the maximum value of the angular velocity of the annular baseplate 2 of the wind rotating means, i.e., $\omega_{max}$=MIN$(\omega_{max1}, \omega_{max2})=\omega_{max2}=2\pi$ rad/s.

Therefore, the range of the angular velocity of the annular baseplate of the wind rotating means would be $$\pi/pm \leq \omega \leq 2\pi \text{ rad/s} \tag{12}$$

The sensor module may comprise at least one rotational speed sensor 13 configured to sense the rotational speed of the wind rotating means 200. The PLC controller may control the number of power generating coils set into the power generation mode according to the rotational speed information sent from the rotational speed sensor 13, where the rotational speed of the wind rotating means 200 may be related to the number of power generating coils set into the power generation mode by a normal distribution function.

The control system may further comprise a remote control server. The input and output module may comprise a wired or wireless network transceiver module. The remote control server may interact and communicate with the PLC controller through Internet or through the wired or wireless network transceiver module, thereby achieving remote control.

The information display apparatus provided by the present disclosure can be used as an advertising display, which has a large display area and can be started in a breeze and is also controllable in a strong wind. Therefore, wind energy can be used to rotate the information display apparatus and generate electricity for use of the billboard itself and lighting of surrounding public spaces. Thus, the wind energy can be effectively converted to kinetic energy to achieve dynamic advertising effects, thereby reducing the strength requirements for the main pillar and the main pillar base and so enabling the information display apparatus with energy saving and environmental protection capabilities.

Figure 4:
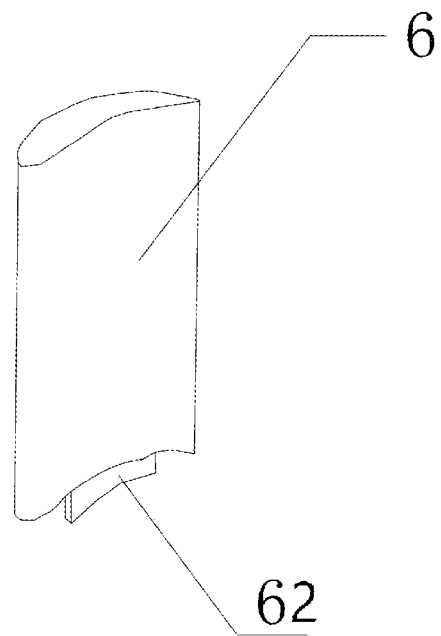
FIG. 4 shows a perspective view of a sail of a multifunction wind-driven apparatus for outdoor all-surrounding information display according to an exemplary embodiment of the present disclosure.

Further, as shown in FIG. 4, the width of the sail 6 is gradually decreased from one end to the other end. At the bottom of the sail 6 is provided a block 62, and on the annular baseplate 2 is defined a snap slot that is to be engaged with the block 62. The sail 6 can be pushed into and secured in the snap slot through the block 62, by which the insertion and removal can be made convenient.

The ratio of the height H of the sail to the radius R of the annular baseplate of the wind rotating means can be 0.3R≤H≤1.2R. This ratio is selected based on a comprehensive consideration of various factors including the power generation efficiency, advertising effects, service life, etc.

The sail can be airfoil-shaped. For example, one side of the sail 6 may be a curved surface while the other side can be a non-planar surface. This structure can enable wind energy capture by the different airflow densities on both sides. The power direction of the airfoil-shaped sail is along the sail towards the head. In addition, the sail is capable of capturing wind energy in a slight wind, so that the apparatus of the present disclosure can be started in a breeze, where the breeze means a very slight wind. Inventor(s) of the present disclosure have proven through many experiments that the apparatus of the disclosure is capable of rotating in a wind of below 1 force, so that it can further be defined that the breeze here means a wind of below 1 force.

Figure 5:
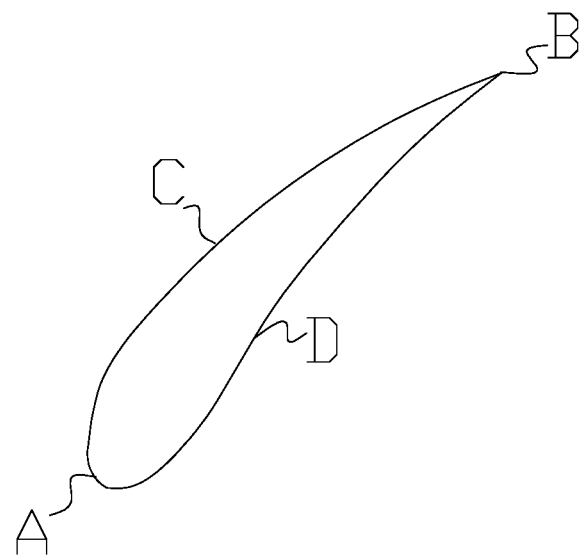
FIG. 5 shows a schematic diagram illustrating the shape of a sail of a multifunction wind-driven apparatus for outdoor all-surrounding information display according to an exemplary embodiment of the present disclosure.
Figure 6:
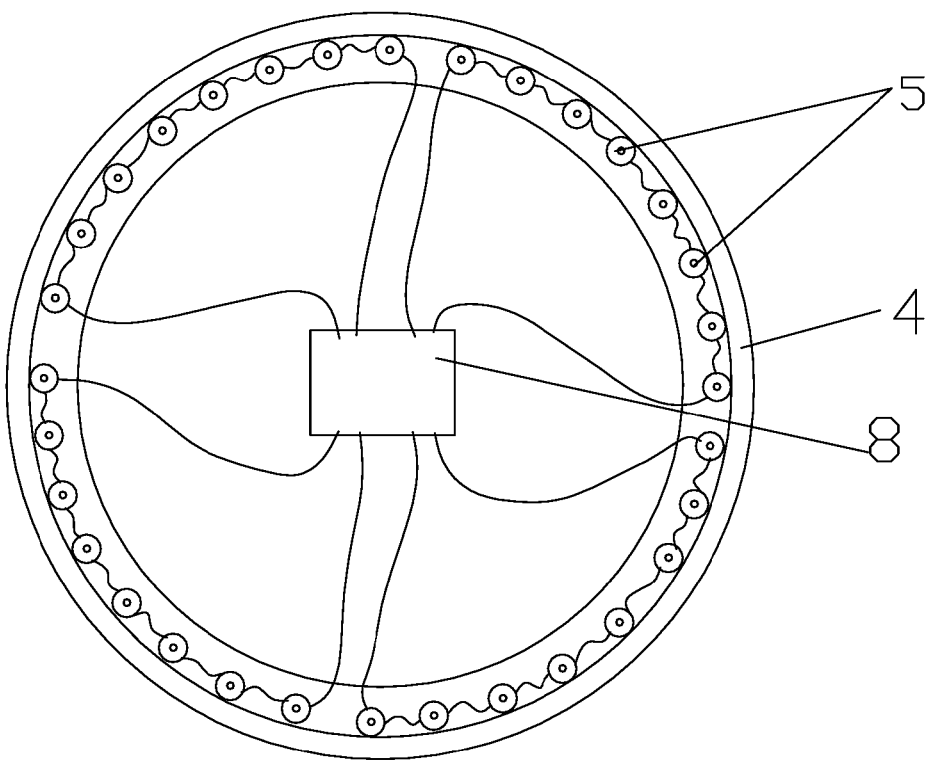
FIG. 6 shows a schematic diagram illustrating the rotational speed sensor controlling the number of active coils in a multifunction wind-driven apparatus for outdoor all-surrounding information display according to an exemplary embodiment of the disclosure.

In the present embodiment, the sail 6 is an air-shaped sail. As shown in FIG. 4, the airfoil-shaped sail may comprise a sail body 6, an LED light strip 61, and a block 62. As shown in FIG. 5, the sail body consists of a head A, a tail B, and two sides (C and D), one end of the sides (C and D) being joined to the head A and the other end directly joined together thus constituting the tail B of the sail. The width of the head of the sail body may be greater than that of the tail. The sails may have the same curvature as the annular baseplate, and may be arranged equidistantly along the circumference of the annular baseplate. The rotation direction of the sail system may be such that the head of the sail leads in the front while the tail follows in the rear. The unique airfoil-shaped sails and the relatively large wind capturing area of the sails allow the sail system to start in a breeze.

The advertisements can be disposed on the outer surface of the sail, or on both inner and outer surfaces of the sail simultaneously. Namely, the exterior of the sail 6 may be used for mounting information display contents. Air vents may be provided among the sails for facilitating the rotation of the annular baseplate 2. In addition, an automatic adjusting device capable of controlling the air vents to turn in accordance with the wind direction can further be provided so as to reduce the resistance against wind and to increase the downwind drive, thereby greatly improving the conversion efficiency. The billboard of the present disclosure can convert wind energy into kinetic energy through rotation, and can reduce the impact of the wind to the multi-function wind-driven information display billboard, thereby reducing the strength requirements for the main pillar and the main pillar base.

The present invention enables the sail system to start in a breeze by the unique airfoil-shaped sails and the relatively large wind capturing area of the airfoil-shaped sails, and by converting the wind energy into kinetic energy, reduces the strength requirements for the main pillar and the main pillar base so that the billboard structure can be optimized. In addition, the spatial rotating multi-angle display feature further improves the space utilization and advertising effects.

The power generation and storage assembly 300 may comprise:

a second shaft shoulder 12 fixedly sheathed on the main pillar 1 of the support frame;

an annular fixing frame 3 provided on an outer side of the annular baseplate 2; where the annular fixing frame 3 and the second shaft shoulder 12 are fixedly connected through the second spoke set 14.

Furthermore, as shown in FIGS. 1 and 2, the power generation and storage assembly 300 may further comprise:

a plurality of sets of power generating coils 5 disposed at an inner side of the annular fixing frame 3, and a plurality of permanent magnets 4 fixed on the periphery of the annular baseplate 2 and opposite to the position of the power generating coils 5; and a storage battery 8 fixed to the support frame for storing electric energy generated when each of the power generating coils is generating electricity, each power generating coil 5 being coupled to the storage battery 8.

Each permanent magnet 4 may be curved in shape and so have curved surfaces, and the magnetic poles of the permanent magnets 4 may be arranged in the same direction. The annular fixing frame 3 may be connected to the second shaft shoulder 12 through the second spoke set 14. The annular fixing frame 3 that has an L-shaped cross section is fixed so as not to rotate, and the coils are arranged equidistantly along the circumference. When the permanent magnets 4 provided on the outer edge of the annular baseplate 2 are rotated along with the rotation of the annular baseplate 2, the plurality of coils 5 may continuously cut the magnetic field lines for the power generation purpose, and the storage battery 8 is further provided to store the electric power generated by each coil 5. The output terminal of each coil 5 is coupled to the input terminal of the storage battery 8. The multi-function wind-driven information display apparatus can not only provide advertising effects, but store excess electric energy into the storage battery 8.

Referring to FIG. 1, an arc-shaped permanent magnet block (i.e., permanent magnet 4) having a width of about twice the thickness of the annular baseplate 2 is arranged on the outer cylindrical surface of the annular baseplate 2.

Figure 3:
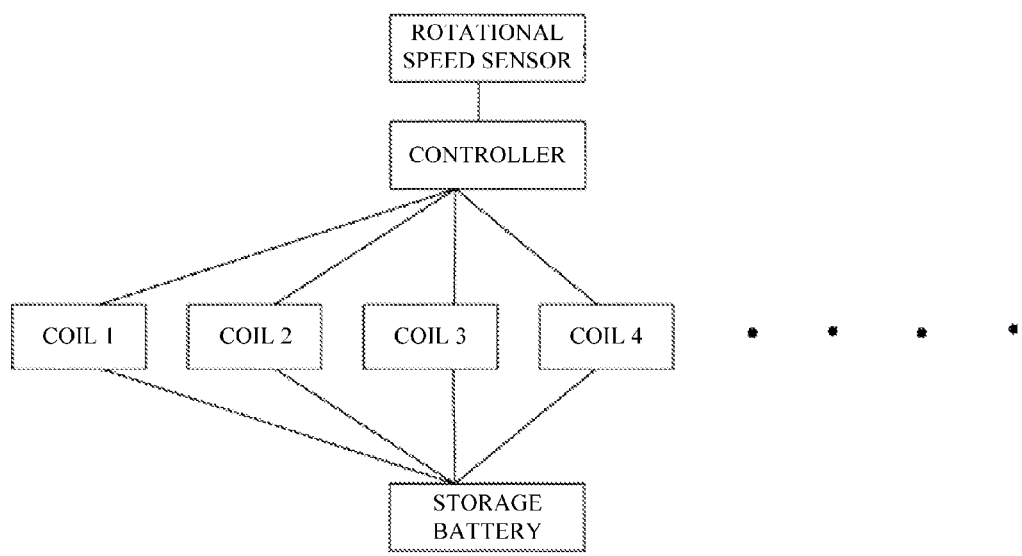
FIG. 3 shows a block diagram illustrating the coils control principles of a multifunction wind-driven apparatus for outdoor all-surrounding information display according to an exemplary embodiment of the present disclosure.

Further, as shown in FIGS. 2 and 3, the multifunction wind-driven information display apparatus may further comprise a rotational speed sensor 13 and a PLC controller disposed on top of the support frame. The power output terminal of each power generating coil is coupled to the power input terminal of the storage battery 8. The controller may control the number of active power generating coils 5 coupled to the storage battery 8 by detecting the rotational speed information sent from the rotational speed sensor 13.

The coils on the annular fixing frame 3 can be divided into four equal numbers of coil sets, with coils in each set being series connected via wires, and both ends of each coil set being coupled to the rotational speed sensor 13 via wires. The rotational speed sensor 13 can automatically adjust the number of coils connected to the loop that participate in cutting the magnetic field lines, and the rotational speed of the sails 6 can be controlled by the resistance produced by the coils cutting the magnetic field lines. The greater the rotational speed of the sail system, the larger the number of coils connected to the loop that cut the magnetic field lines, also the rotational speed of the sails 6 can be constricted within a certain range, which not only ensures the safety of the power generation system, but prevent the exceedingly large speed of the billboard from damaging the equipment or reducing the advertising information distribution effects.

The rotational speed of the annular baseplate may be consistently maintained at the optimum angular speed by controlling the motor generator and the number of coil sets coupled to the circuit, and on such a basis, the number and positions of active LED light-emitting strips, as well as the lighting duration of the LED light-emitting strips, the time interval between two consecutive lighting sessions, the display contents can also be controlled so that the information display apparatus can present a superior information image.

The rotational speed sensor 13 can be a light sensor fixed to the upper end of the main pillar 1 for sensing the rotational speed of the annular baseplate 2 and for controlling the number of coils coupled to the loop that cut magnetic field lines according to the rotational speed. The timer may include an electronic watch fixed to the main pillar and used to control all the lights to connect to the battery at every specific set time.

As shown in FIGS. 2 and 3, the rotational speed of the annular baseplate 2 is sensed by the rotational speed sensor 13. When the rotational speed is low, the controller may control to reduce the number of the power generating coils 5 connected to the battery 8, and in some cases the number would be reduced to 0. When the rotational speed is high, the controller may control to increase the number of the power generating coils 5 connected to the battery 8 to increase the amount of generated electricity and to increase the resistance applied to the rotation of the annular baseplate 2. Consequently, the present disclosure skillfully achieves the dynamic balancing process. In particular, when the rotational speed is high, the number of active power generating coils 5 is increased so that the generated power increases and so does the resistance, whereby the rotational speed is slowed down. Then in response to the reduced rotational speed the number of active power generating coils is reduced and so is the resistance, so that the speed increases until an equilibrium state is finally reached.

The storage battery 8 may be a lithium battery. The lithium battery is easy to maintain and has a long life and a large storage capacity.

Further, as shown in FIG. 2, the wind-driven outdoor all-surrounding information display apparatus may be provided with illumination lights and a timer 9 that is used to control the illumination of the lights. The illumination lights can be mounted on the sails 6 which are used to arrange the information display contents. The lighting time can be set by the timer 9. For example, the time can be set to dusk when it is getting dark to control the battery 8 to supply power to the lights, so that the contents of the billboard can be seen in the dark, thereby improving the utility of the present disclosure.

Embodiment 2

The methods, apparatuses, and control systems according to the present embodiment are essentially the same as those of Embodiment 1, only that in the present embodiment:

the variable-speed adaptive operation mode is applied, in which the control system may keep the rotational speed of the wind rotating means 200 within the predetermined rotational speed range which is bound by a maximum rotational speed and a minimum rotational speed, according to the actual change of the external natural wind condition, rather than applying control over the realtime rotational speed that falls within the range, (e.g., a tolerance of ±10 times the reference rotational speed is offered, but the wind rotating means needs to be controlled to operate within the safe rotational speed range). The control system may base on a predetermined program while factoring the realtime rotational speed as the reference variable to control the initial lighting time, lighting duration, lighting interval, and displayed content of each electronically controlled light-emitting display strip 61, or control part or all of the electronically controlled light-emitting display strips to be in operation, so that the trajectories swept by the electronically controlled light-emitting display strips 61 after they are lit and rotate form a continuous and complete image on the entire cylindrical surface.

The operation and control mode according to this embodiment is directed to the control of the number and positions of the active LED light-emitting stripes and the time when each LED light-emitting strip enters the active state, according to the rotational speed of the annular baseplate that changes under the force of the wind, so that a complete, continuous, and all-surrounding image can be formed on the entire cylindrical surface that is swept by the light-emitting strips. Furthermore, the lateral spacing of the light-emitting strips and lighting duration and/or lighting time interval between two consecutive lighting sessions during which the active LED light-emitting strips perform the information display action can also be controlled, so that a complete image can be formed on the entire cylindrical surface that is swept by the light-emitting strips on the sails 6. When the outdoor wind is unsteady which results in an unsteady rotational speed, then, by controlling the total number of active LED light strips and the lighting duration and the time interval between two consecutive lighting sessions of each active LED light strip that performs the display action, the image can be adjusted as desired. When the outdoor wind speed is too strong which results in an excessive large rotational speed of the annular baseplate, the number of active LED light strips can be appropriately reduced and/or the lighting duration of each active LED light strip that performs the display action can be correspondingly reduced while the lighting interval between two consecutive lighting sessions can be increased, so that a complete image can be formed on the entire cylindrical surface that is swept by the airfoil-shaped vanes. Similarly, when the outdoor wind speed is too small which results in a slow rotational speed of the annular baseplate, the number of active LED lights strips can be appropriately increased and/or the lighting duration of each active LED light strip that performs the display action can be correspondingly increased while the lighting interval between two consecutive lighting sessions can be reduced.

In the wind-driven information display apparatus of the present embodiment, the support frame is a hanging bracket used for hanging and fixing. The hanging bracket may comprise a hook, a support strut connected to the hook and used to support the wind rotating means. Thus, the multifunction wind-driven information display apparatus of the present disclosure can be hung and installed to suit different installation sites.

In a further embodiment, the multifunction wind-driven information display apparatus may further comprise a solar panel disposed at an inner side of the sails 6 for converting solar energy into electrical energy, the solar panel being electrically connected to the battery. For example, the electrical energy that is converted from the solar panel can be connected to the storage battery 8 via a changeover switch.

As described above, the present disclosure is predicated on the use of natural wind energy to drive the annular baseplate to rotate to generate power and simultaneously drive the displayed contents on the light-emitting strips of the information display apparatus to rotate thus creating an image. In particular, the information display apparatus may generally control the rotational speed, the number and positions of the operative LED light strips, and the time when each LED light-emitting strip enters the operative state, so as to form a complete, continuous and all-surrounding image along the entire cylindrical surface that is swept by the light-emitting strips.

It should be appreciated that the applications of the present disclosure shall not be limited to the above examples, and those of ordinary skill in the art can make various modifications or variations based on the above description, and all such modifications or variations shall all fall in the claimed scope of the appended claims.

What is claimed is:

1. A method for adaptive wind-driven outdoor all-surrounding information display, comprising:
  installing an outdoor information display apparatus driven by natural outdoor wind, the apparatus comprising, from bottom to top:
    a support means;
    a wind rotating means, comprising an annular baseplate and a plurality of sails disposed on the annular baseplate and used to capture wind energy and convert it to mechanical power;
    an information display means, comprising a plurality of information display devices each installed on the corresponding sail and comprised of at least one electronically controlled light-emitting display strip that is disposed on an outer elevation of the sail and used to distribute graphic and textual information, the support means and the wind rotating means cooperating with each other to achieve wind power generation and rotational speed control of the information display means;
    a motor/generator assembly, being installed on the support means and the wind rotating means and comprised of a plurality of working units that cooperate with each other to drive the wind rotating means to generate power or keep spinning, the motor/generator assembly turning the mechanical power of the wind rotating means to electric energy and storing the electric energy or converting the stored electric energy to mechanical power to maintain the rotation of the wind rotating means, thereby enabling adaptive control and adjustment of the mutual conversion relation and ratio between the mechanical power and the electric energy by switching between electric-operating and electric-generating modes or by controlling the number of active working units on the wind rotating means and the support means; and
    a control system, being coupled to each of the working units of the motor/generator assembly and to each of the electronically controlled light-emitting display strips; and
  controlling, by the control system, the cooperation among the working units on the wind rotating means and the support means thus enabling the wind rotating means and the support means to make adaptive adjustments under different wind conditions detected by the control system, wherein the control system automatically controls a mutual conversion ratio between the mechanical power and the electric energy so as to control the plurality of sails to operate within a predetermined rotational speed range, or instantaneously controls, according to the actual rotational speed or speed change of the wind rotating means under the drive of the natural wind, the lighting time, lighting duration, lighting interval, and displayed content of each electronically controlled lighting-emitting display strip or controls part or all of the electronically controlled light-emitting display strips to turn active, so that dynamic trajectories of the displayed contents of all electronically controlled light-emitting display strips after they are lit and rotate are successively connected with each other thus creating an all-surrounding and continuous visible graphic and textual image.

2. The method according to claim 1, wherein the plurality of working units comprise power generation units and motor units, the power generation units being composed of power generating windings of a plurality of stators and rotors which are oppositely disposed on the support means and the wind rotating means, the motor units being composed of a plurality of electric motors and transmission gear sets disposed on the support means or the wind rotating means.

3. The method according to claim 2, wherein controlling the cooperation among the working units on the wind rotating means and the supports and the operation of the information display means comprises:
  switching, by the control system, between operating modes according to the wind condition sensed by the control system, comprising:
  when the wind is moderate and the rotational speed of the wind rotating means does not exceed a predetermined maximum or minimum speed, switching, by the control system, the operating mode of the information display apparatus to power generation/forward mode, cutting off the motor units, turning on part of the working units of the motor/generator assembly to generate and store electric power and supply power to the information display means, where the stronger the wind, the larger the number of power generation units that are turned active; the gentler the wind, the smaller the number of active power generation units; and the resistance produced when the active power generation units are operating is used to control the rotational speed of the display device at a normal rotational speed, so that the dynamic trajectories of the contents displayed by the plurality of rotating electronically controlled light-emitting display strips after they are lit are successively connected with each other, thus creating an all-surrounding and continuous visible graphic and textual image;
  when the wind is exceedingly strong while the wind rotating means does not surpass the predetermined maximum rotational speed, switching, by the control system, the operating mode of the information display apparatus to power generation/protection mode, cutting off the motor units, turning active all power generation units of the motor/generator assembly to fully generate and store electric power, and turning off the information display means, so as to constrict the rotational speed and maintain the safety of the information display apparatus; and
  when the wind is too weak and the speed of the wind rotating means is lower than the predetermined minimum speed, switching, by the control system, the operating mode of the information display apparatus to electric-operating/reverse mode, cutting off the power generation units to stop generating power, turning on the motor units to convert the stored electric power to mechanical energy so as to maintain the display device at the predetermined minimum rotational speed, so that the dynamic trajectories of the contents displayed by the plurality of rotating electronically controlled light-emitting display strips after they are lit and rotate are successively connected with each other thus creating an all-surrounding and continuous display of visible graphic and textual image.

4. The method according to claim 1, wherein the control system is configured to simultaneously control the rotational speed of the wind rotating means and the initial lighting time, lighting duration, lighting interval, and displayed content of each electronically controlled light-emitting display strip of the information display means, or control part or all of the electronically controlled light-emitting display strips to be active, so as to enable the trajectories swept by the plurality of electronically controlled light-emitting display strips after they are lit and rotate to create a continuous and complete image on the entire cylindrical surface; let the visual retention time coefficient be p seconds, then the various parameters satisfy the following relation so as to control the rotational speed of the wind rotating means within the predetermined range:

$$2\pi = pn\omega \quad (1)$$

or $$2\pi R = pnv \quad (2)$$

where:
p is the visual retention time coefficient, and $0.1s \leq p \leq 0.4s$;
n is the total number of active electronically controlled light-emitting display strips on the sails, and $1 \leq n \leq 5m$, where m is the number of sails;
$\omega$ is the angular velocity of the annular baseplate of the wind rotating means, and $\pi/pm \leq \omega \leq 2\pi$ rad/s;
R is the radius of the annular baseplate, and $1m \leq R \leq 50m$ rad/s; and
v is the tangential velocity of the sails on the annular baseplate of the wind rotating means, with a unit of m/s.

5. The method according to claim 1, wherein each electronically controlled light-emitting display strip comprises a backlight plate disposed oriented outwards inside an outer elevation of the corresponding sail, a plurality of LED light-emitting strips, and a light guide column arranged on the outer elevation, where the LED light-emitting strip comprises a single row or multiple rows of high power LED light beads, the light guide column being a cylinder or cone with a geometric centerline of a downward inclination angle of 5~45°.

6. An apparatus for adaptive wind-driven outdoor all-surrounding information display, the apparatus comprising, from bottom to top:
a support means;
a wind rotating means, comprising an annular baseplate and a plurality of sails disposed on the annular baseplate and used to capture wind energy and convert it to mechanical power;
an information display means, comprising a plurality of information display devices each installed on the corresponding sail and comprised of at least one electronically controlled light-emitting display strip that is disposed on an outer elevation of the sail and used to distribute graphic and textual information, the support means and the wind rotating means cooperating with each other to achieve wind power generation and rotational speed control of the information display means;
a motor/generator assembly, being installed on the support means and the wind rotating means and comprised of a plurality of working units that cooperate with each other to drive the wind rotating means to generate power or keep spinning, the motor/generator assembly turning the mechanical power of the wind rotating means to electric energy and storing the electric energy or converting the stored electric energy to mechanical power to maintain the rotation of the wind rotating means, thereby enabling adaptive control and adjustment of the mutual conversion relation and ratio between the mechanical power and the electric energy by switching between electric-operating and electric-generating modes or by controlling the number of active working units on the wind rotating means and the support means; and
a control system, being coupled to each of the working units of the motor/generator assembly and to each of the electronically controlled light-emitting display strips, the control system being configured to control the cooperation among the working units on the wind rotating means and the support means thus enabling the wind rotating means and the support means to make adaptive adjustments under different wind conditions detected by the control system, wherein the control system automatically controls a mutual conversion ratio between the mechanical power and the electric energy so as to control the plurality of sails to operate within a predetermined rotational speed range, or instantaneously controls, according to the actual rotational speed or speed change of the wind rotating means under the drive of the natural wind, the lighting time, lighting duration, lighting interval, and displayed content of each electronically controlled light-emitting display strip or control part or all of the electronically controlled light-emitting display strips to turn active, so that dynamic trajectories of the displayed contents of all electronically controlled light-emitting display strips after they are lit and rotate are successively connected with each other thus creating an all-surrounding and continuous visible graphic and textual image.

7. The apparatus according to claim 6, wherein the plurality of working units comprise power generation units and motor units, the power generation units being composed of power generating windings of a plurality of stators and rotors which are oppositely disposed on the support means and the wind rotating means, the motor units being composed of a plurality of electric motors and transmission gear sets disposed on the support means or the wind rotating means.

8. The apparatus according to claim 6, wherein the support means comprises a support frame used to fixedly hang or support a main body portion of the wind-driven information display apparatus, the support frame comprising a base, and a main pillar disposed on the base and used to support the wind rotating means, the wind rotating means being disposed above the support frame and driven by wind for power generation and storage, and the information display means being disposed above the wind rotating means and rotated by the rotation of the wind rotating means and used to set information display contents.

9. The apparatus according to claim 8, wherein the wind rotating means comprises:
a first shaft shoulder rotatably sheathed on the main pillar of the support frame;
an annular baseplate connected to the first shaft shoulder through a first spoke set and used to install the sails;
a plurality of sails disposed along a top surface of the annular baseplate and used to rotate the annular baseplate by wind; and
a power generation and storage assembly disposed below the wind rotating means and fixed to the support frame for generating and storing power in cooperation with the wind rotating means.

10. The apparatus according to claim 9, wherein the power generation and storage assembly comprises:
a second shaft shoulder fixedly sheathed on the main pillar of the support frame;

an annular fixing frame provided on the outer side of the annular baseplate, the annular fixing frame and the second shaft shoulder being fixedly connected via a second spoke set;

a plurality of sets of power generating coils or magnets disposed at an inner side of the annular fixing frame;

a plurality of magnets or coils fixedly disposed at the periphery of the annular baseplate and opposite to the power generating coils, where each set of cooperative power generating coils or magnets constitutes a power generation working unit;

and a storage battery fixed to the support frame for storing electric energy generated when each of the power generating coils is generating power, each power generating coil being coupled to the storage battery.

11. The apparatus according to claim 10, further comprising a controller and a rotational speed sensor provided on top of the support frame, a power output terminal of each power generating coil being coupled to a power input terminal of the storage battery, the controller being configured to control the number of power generating coils coupled to the storage battery by detecting the rotational speed information sent from the rotational speed sensor.

12. The apparatus according to claim 6, wherein each sail is airfoil-shaped, the width of the sail is gradually decreased from one end to the other; a block is provided at the bottom of the sail and a snap slot matched with the block is provided on the annular baseplate, and the sail is secured in the snap slot by the block.

13. The apparatus according to claim 6, wherein a ratio of the height of each sail to the radius of the annular baseplate of the wind rotating means is: $0.3R \leq H \leq 1.2R$.

14. The apparatus according to claim 6, wherein each electronically controlled light-emitting display strip comprises a backlight plate disposed oriented outwards inside an outer elevation of the corresponding sail, a plurality of LED light-emitting strips, and a light guide column arranged on the outer elevation, where the LED light-emitting strip comprises a single row or multiple rows of high power LED light beads, the light guide column being a cylinder or cone with a geometric centerline of a downward inclination angle of 5~45°.

15. A control system for adaptive wind-driven outdoor all-surrounding information display that implements the method according to claim 1, the control system comprising:

a PLC (Programmable Logic Controller) controller and a sensor module, the PLC controller being embedded with control software that is included with conditional functions configured to control the rotational speed of the wind rotating means and the number of active electronically controlled light-emitting display strips and relevant operating parameters, the PLC controller being configured to control simultaneously the rotational speed of the wind rotating means and the initial lighting time, lighting duration, lighting interval, and displayed content of each electronically controlled light-emitting display strip of the information display devices, or control part or all of the electronically controlled light-emitting display strips to turn active, so that trajectories swept by each of the electronically controlled light-emitting display strips after they are lit and rotate create a continuous and complete image on the entire cylindrical surface; let the visual retention time coefficient be p seconds, then the control function is as follows so that the rotational speed of the wind rotating means is controlled within the predetermined range:

$$2\pi = pn\omega \tag{3}$$

or $$2\pi R = pnv \tag{4}$$

where:

p is the visual retention time coefficient, and $0.1s \leq p \leq 0.4s$;

n is the total number of active electronically controlled light-emitting display strips on the sails, and $1 \leq n \leq 2m$, where m is the number of sails;

ω is the angular velocity of the annular baseplate of the wind rotating means, and $\pi/pm \leq \omega \leq 2\pi$ rad/s;

R is the radius of the annular baseplate of the wind rotating means, and $1m \leq R \leq 50m$ rad/s; and v is the tangential velocity of the sails on the annular baseplate of the wind rotating means, with a unit of m/s.

16. The control system according to claim 15, wherein assuming an image is continued a period of $t_1$ after an electronically controlled light-emitting display strip is lit, and the display strip rotates an angle of θ during the period of $t_1$, then $t_1$ is related with the angular velocity:

$$t_1 = \theta/\omega \text{ or } \theta = t_1 * \omega \tag{5}$$

the information display apparatus satisfies the following condition so that the trajectories swept by the active display strips create a continuous and complete image on the entire cylindrical surface:

$$2\pi = \theta * n \text{ or } n = 2\pi/\theta \tag{6}$$

where n is the total number of active electronically controlled light-emitting display strips on the sails, and $1 \leq n \leq 2m$, where m is the number of sails; and ω is the angular velocity of the annular baseplate of the wind rotating means, and $\pi/pm \leq \omega \leq 2\pi$ rad/s.

17. The control system according to claim 16, wherein assuming, during the continuous rotation process of the same electronically controlled light-emitting display strip, the first image after the electronically controlled light-emitting display strip is lit is sustained a duration of $t_1$ before it is turned off, and after a time interval of $t_2$ a consecutive second image is re-lit, the following condition is satisfied so that the trajectories swept by the display strips after they are successively lit and rotate create a continuous and complete image on the entire cylindrical surface:

$$t_2 = n_1(t_1 + p) \tag{7}$$

where $n_1$ is the total number of active electronically controlled light-emitting display strips on the plurality of sails, and $1 \leq n1 \leq 2m$, where m is the number of sails;

p is the visual retention time coefficient, and $0.1s \leq p \leq 0.4s$;

$t_1$ is the duration when the first image of the electronically controlled light-emitting display strip is lit, with a unit of s; and $t_2$ is the time interval between the time when the first image is turned off after it has been lit for the continuous period of $t_1$ and the time when the consecutive second image is re-lit, during the continuous rotation process of the same electronically controlled light-emitting display strip, with a unit of second.

18. The control system according to claim 15, wherein the sensor module comprises at least one rotational speed sensor configured to sense the rotational speed of the wind rotating means, the PLC controller being configured to control the number of power generating coils turned into the power generation mode by the rotational speed information sent from the rotational speed sensor, the rotational speed of the wind rotating means being related to the number of power generating coils turned into the power generation mode by a normal distribution function.

* * * * *